Patented Nov. 15, 1949

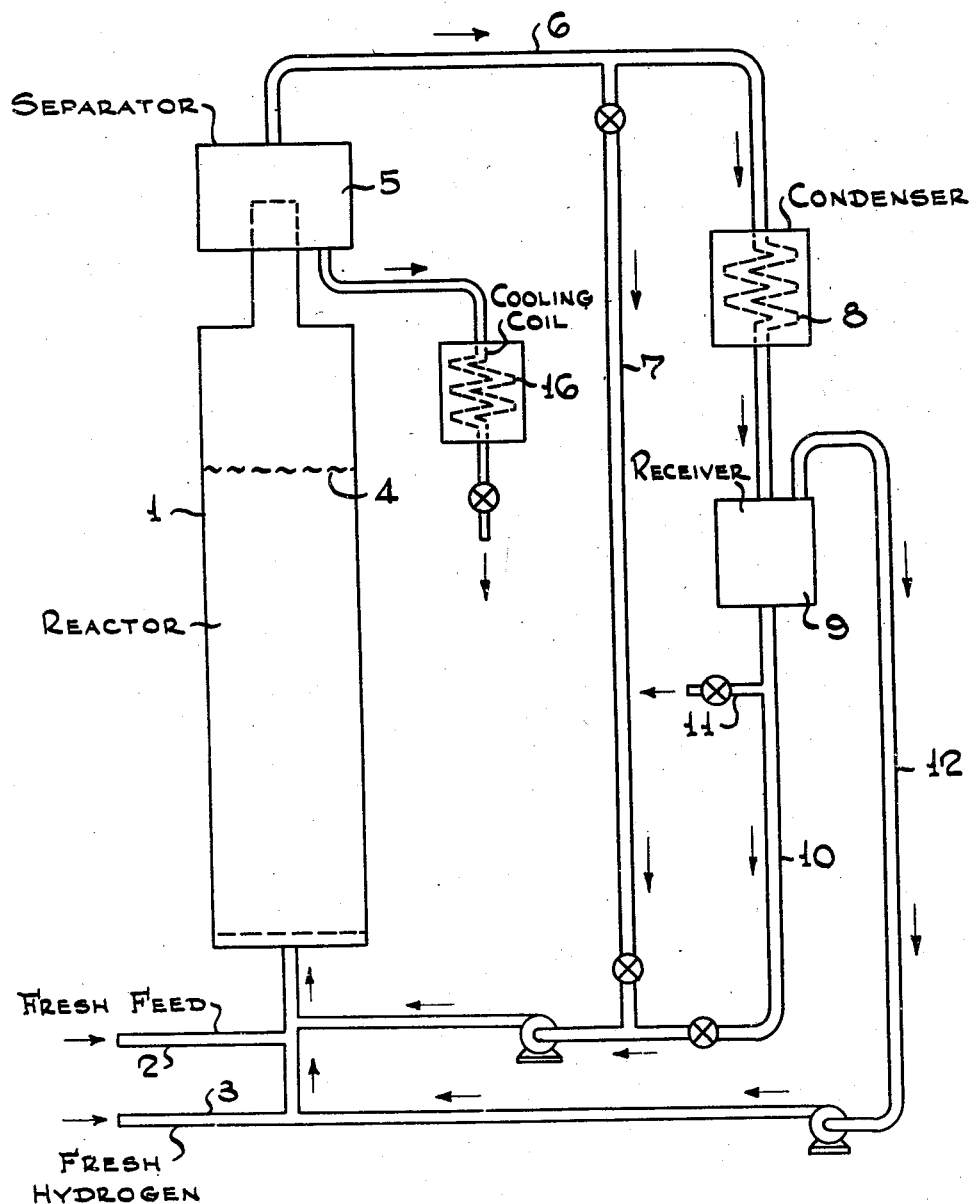

2,488,145

UNITED STATES PATENT OFFICE 2,488,145

HYDROGENATION OF OLEFIN POLYMER LIQUIDS

Warren M. Smith and Ralph B. Mason, Baton Rouge, La., assignors to Standard Oil Development Company, a corporation of Delaware Application September 7, 1946, Serial No. 695,526

3 Claims. (Cl. 260—683.6)

This invention pertains specifically to catalytic hydrogenation of olefin polymer liquids such as tri-isobutylene and the like, which tend to be cracked when treated under usual vapor phase conditions in the presence of a catalytic contact mass.

Low temperature hydrogenation treatments of hydrocarbons susceptible to cracking have given excellent yields with catalysts which are highly active but very sensitive to poisoning by sulfur. The poor catalyst life of the sulfur-sensitive catalyst, typified by metallic nickel, is disadvantageous to their commercial utilization in treating petroleum products which generally contain sulfur impurities. On the other hand, sulfur-insensitive hydrogenation catalysts, typified by metal sulfides, unsupported or supported on inorganic adsorbent carriers used under optimum conditions for hydrogenating the hydrocarbons in vapor phase, have a long catalyst life but give relatively poor yields because excessive cracking of the hydrocarbons occurs under these conditions.

The primary objects of this invention are to provide a method of obtaining improved yields in hydrogenating unsaturated hydrocarbons susceptible to cracking by using an efficient low-temperature operation and a sulfur-resistant catalyst.

By impregnating charcoal or a similar inert porous base of negligible splitting tendency with a reduced metal or metal oxide of a metal selected from groups VI and VIII of the periodic table and by "hydrosulfiding," i. e., treating with a gas containing hydrogen sulfide to the extent that the hydrogen sulfide, even in the case of a metal sulfide catalyst, is adsorbed by the catalyst as hereinafter more fully explained, such impregnated base, a sulfur-resistant catalyst of satisfactory hydrogenation activity and selectivity in either a liquid or mixed phase type of hydrogenation is prepared. This type of catalyst used for hydrogenating tri-isobutylene in the liquid phase gives yields of hydrotrimer approaching those obtained with sulfur-sensitive nickel catalyst; i. e., yields above 90%. In the past, the highest yields obtained with sulfur-insensitive catalysts were only approximately 80%.

The charcoal base-supported catalyst is readily and cheaply prepared. It is easily duplicated and has very low bulk density. If any other base is to be substituted for charcoal as the catalyst support, it should be preferably a material having larger pore size than silica gel or alumina. For example, pumice or clays are indicated to be better than silica gel or alumina for obtaining the desired type of supported catalyst with good selectivity for avoiding excessive cracking. The preferred base is charcoal.

The metal-containing catalyst ingredient may be deposited on or in the support by several methods familiar to those skilled in the art. In general, these methods involve impregnation of the support by solutions containing a compound of the metal ingredient, following which the metal oxide or reduced metal is obtained by thermal decomposition or by precipitation. For example, in depositing molybdenum oxide on charcoal, ammonium molybdate is retained by the charcoal when wetted by an ammoniacal solution of ammonium molybdate. The salt impregnated charcoal is dried and heated to decompose the salt to the oxide. Reducing gases are passed over the impregnated charcoal to accelerate the decomposition or reduction and avoid overheating.

For satisfactory performance of reduced metal or metal oxide components of a catalyst used for attaining the objects of the present invention, the catalyst has to be preactivated by a hydrogen sulfide treatment which is a treatment under conditions favorable for the adsorption of hydrogen sulfide by the catalyst. Even, if the catalyst is in a sulfided form, preactivation by hydrogen sulfide adsorption is important for giving the catalyst low-temperature activity.

Proper activation of charcoal-supported catalysts is obtained by contacting them with hydrogen sulfide gas at temperatures in the range of 600°–900° F. until the adsorption of hydrogen sulfide by the catalyst reaches a saturation or equilibrium adsorption point. Using a mixture of hydrogen sulfide and nitrogen (1 vol. $H_2S$ to 5 vol. $N_2$), activation of molybdenum oxide deposited on charcoal takes place in about 6 hours at 875° F. with the gas under atmospheric pressure. The hydrogen sulfide gas may be diluted with inert gases or hydrogen.

The catalyst activated by the hydrogen sulfide treatment loses hydrogenating activity rapidly during its use in a continuous process if no appreciable hydrogen sulfide concentration is maintained in the reaction zone. Satisfactory activity is maintained for a prolonged period when the hydrogen sulfide concentration in the hydrogenating gas is maintained at about 0.08% to 2%. During pressure testing with pure hydrogen, the activated catalyst loses activity; also, in a continuous process over a long period the catalyst tends to become deactivated, even if hydrogen sulfide is supplied to the reaction zone, but the catalyst can be reactivated by a further treatment with hydrogen sulfide while it is not participating in a hydrogenation reaction.

The activated sulfur-resistant catalyst on a charcoal base or inert type support may be used in varying concentrations, e. g., from about 10% to 200% by weight of feed. In general, an increased concentration of the catalyst improves activity or rate of hydrogenation without much influence on selectivity, but at above 100% concentration of the supported catalyst with respect to the feed there is not much change in activity.

On using the preactivated sulfur-resistant catalysts in conventional continuous unit operations, it was found that the yields were not as good as when these catalysts were employed in batch autoclave operations, wherein the hydrocarbon remains more generally in liquid phase during contact with the catalyst.

It was observed in the conventional continuous type unit that a vaporized portion of the feed tends to be rushed through the reaction zone with the hydrogen gas stream, and in effect the vaporized portion of the feed by-passes the catalyst. The vaporized portion does not have sufficient contact with the catalyst and upon analysis indicates lowered catalyst activity.

The undesirable features of continuous unit operation with a sulfur-resistant catalyst adapted for liquid phase hydrogenation are to be overcome by separating the reactor vapor stream from liquid products immediately after these materials leave the reaction zone and before condensation of the hydrocarbon reactant vapor is effected so that the reactant may be subjected to further hydrogenation treatment. The further hydrogenation treatment may be carried out by recycling the separated vapor mixed with hydrogenating gas directly to the reaction zone or by separately condensing the vapor and recycling the resulting reactant condensate to the reaction zone as shown in the diagram.

The diagram in the accompanying drawing shows schematically a flow plan of a continuous hydrogenation unit for carrying out an embodiment of the invention.

Referring to the drawing, 1 represents the reactor which is supplied with fresh feed of an oil to be hydrogenated from line 2 and is supplied with a hydrogen gas from line 3. The hydrogenating feed products which remain in liquid phase are carried along with vapors and excess hydrogen gas up through a catalyst bed 4 in the reaction zone of the reactor 1 and overflow into the separator 5. The liquid hydrogenated product is withdrawn from the separator 5 through a heat exchanger or cooling coil 16 to storage. The gas and vapor stream is passed from the separator 5 by line 6 to a total recycle line 7 or to the condenser 8. Receiver 9 collects condensate which in part or whole may be recycled through line 10 to the reactor 1. Some of the condensate may be withdrawn from line 10 through line 11 for storage without recycling. Excess hydrogen gas is recycled from the receiver 9 by line 12 to the reactor.

It is to be understood that modified arrangements may be made in the system, as, for example, by having a downflow rather than an upflow through the reactor; also, the system can be modified by using a fluid or suspended catalyst rather than a fixed bed catalyst. The catalyst may be periodically reactivated in the manner of the preactivation.

In using the operation designed for improved liquid or mixed phase hydrogenation treatments, various types of catalyst and conditions may be used but the hydrogen sulfide activated sulfur-resistant catalyst on charcoal or similar supports gives outstanding performance on sulfur-containing feeds. With sulfur-free feeds the sulfur-sensitive reduced metals on porous supports are effective.

In the liquid and mixed phase hydrogenation treatments, the temperatures vary from 200° to 600° F. and the pressures from 1 to 300 atmospheres and higher. The preferred temperature range is from 400° to 550° F. in using the hydrogen sulfide activated sulfur-resistant catalyst on inert supports.

The hydrogen feed rates are in the range of 50 to 5,000 cubic feet per gallon of feed processed. Liquid feed rates varying from 0.2 to 2.5 volume per volume of catalyst per hour are employed.

In the search for possible sulfur-resistant catalysts of high activity and selectivity at low temperatures, it was found that the hydrogen sulfide activated metal oxides of metals in group VI of the periodic table were superior to all others. Next in order come the hydrogen sulfide activated metal oxides and reduced metals of metals in group VIII in the periodic table. The highest hydrogenating activity is indicated by the lowest bromine number (Br. No.), the bromine number being substantially 0 when the saturation of double bonds is complete. Higher activity is, in general, indicated by lower gravity of the hydrogenated products, the A. P. I. gravity of a hydrogenated tri-isobutylene product which has undergone negligible cracking being about 57.0 to 58.0. Relative efficiencies of various catalysts for hydrogenation of a tri-isobutylene feed are shown by the summarized results on comparative test data in the following table:

*Performance characteristics of catalysts in mixed vapor-liquid phase treatments*

| Metal Ingredient | MoO₃ | Fe | NiWO₄ | WO₃ | NiS+WS₂ | NiO |
|---|---|---|---|---|---|---|
| Weight Per cent Cat./Feed | 20% | | | | | |
| Temperature, °F | 450° F. | | | | | |
| Pressure, p. s. i. g | 2500–2800 | | | | | |
| Catalyst Base | Activated coconut charcoal | | | | | |
| Activation | Hydrosulfiding | | | | | |
| Inspections: | | | | | | |
| Feed— | | | | | | |
| Gravity | 52.2 | 53.6 | 53.6 | 54 | 54 | 54 |
| Bromine No. | 94 | 89 | 89 | 99 | 99 | 99 |
| Product— | | | | | | |
| Gravity | 57.0 | 59.9 | 57.1 | 57.8 | 60.8 | 59.4 |
| Bromine No. | 2 | 2 | 10 | 4 | 15 | 6 |

Generalized formulae:
MoO₃=molybdenum oxide. Fe=iron.
NiWO₄=nickel tungstate. WO₃=tungsten oxide.
NiS+WS₂=14% nickel sulfide+86% tungsten sulfide.
NiO=nickel oxide.

Studies on the treatments of different feed stocks, such as topped tri-isobutylene cuts, hot acid copolymers, and cold acid trimers including some dimers, indicate that the acivities of the sulfur-resistant catalysts activated by hydrogen sulfide were about the same with each feed stock. The feed stocks may thus be mixed with lower boiling diluents or may be a wide cut feed, but a major part of each of these feeds will boil above 300° F. Although the described method is particularly suitable for hydrogenating C₁₂ to C₁₆ olefin hydrocarbons boiling in the range of 300 to 500° F., it is indicated to be suitable also for higher boiling unsaturated hydrocarbon liquids and organic liquids, which in general tend to undergo splitting when they are subjected to catalytic reaction in the vapor phase.

We claim:
1. The continuous method of non-destructively hydrogenating a branched olefin polymer oil boiling in the range of 300° to 500° F., which comprises contacting said oil at least partly in liquid phase in a stream of hydrogen at 400° to 550° F. with a sulfur-resistant catalyst which is saturated with hydrogen sulfide adsorbed at 600° to 900° F., continuously supplying a small amount of hydrogen sulfide to the stream of hydrogen, separating hydrogenated liquid from a vaporized portion of the oil passed over the catalyst, condensing said vaporized portion of the oil, recontacting condensate from said vaporized portion of the oil with the catalyst under the conditions of hydrogenation stated, and periodically reactivating the catalyst by contacting it with gas containing hydrogen sulfide at 600° to 900° F.

2. The method set forth in claim 1 in which the catalyst employed is a supported sulfide of a metal selected from the class of group VI metals.

3. The method set forth in claim 1 in which the catalyst employed is a supported sulfide of a metal selected from the class of group VIII metals.

WARREN M. SMITH.
RALPH B. MASON.

REFERENCES CITED

The following references are of record in the file of this patent:

UNITED STATES PATENTS

| Number | Name | Date |
| --- | --- | --- |
| 2,131,089 | Beeck et al. | Sept. 27, 1938 |
| 2,203,842 | Pier | June 11, 1940 |
| 2,206,376 | Vlugter | July 2, 1940 |
| 2,238,851 | Pier et al. | Apr. 15, 1941 |
| 2,379,410 | Bannerot et al. | July 3, 1945 |
| 2,422,991 | Strang | June 24, 1947 |